United States Patent
Sakai et al.

(10) Patent No.: US 7,442,260 B2
(45) Date of Patent: Oct. 28, 2008

(54) GRAIN-ORIENTED ELECTRICAL STEEL SHEET SUPERIOR IN ELECTRICAL CHARACTERISTICS AND METHOD OF PRODUCTION OF SAME

(75) Inventors: Tatsuhiko Sakai, Futtsu (JP); Hideyuki Hamamura, Futtsu (JP); Naoya Hamada, Futtsu (JP)

(73) Assignee: Nippon Steel Corooration, Tokyo (JP)

( * ) Notice: Subject to any disclaimer, the term of this patent is extended or adjusted under 35 U.S.C. 154(b) by 452 days.

(21) Appl. No.: 10/549,723

(22) PCT Filed: Mar. 5, 2004

(86) PCT No.: PCT/JP2004/002866

§ 371 (c)(1),
(2), (4) Date: Sep. 16, 2005

(87) PCT Pub. No.: WO2004/083465

PCT Pub. Date: Sep. 30, 2004

(65) Prior Publication Data

US 2006/0169362 A1    Aug. 3, 2006

(30) Foreign Application Priority Data

Mar. 19, 2003  (JP) .............................. 2003-075930

(51) Int. Cl.
*H01F 1/14* (2006.01)
*H01F 1/16* (2006.01)

(52) U.S. Cl. ...................... 148/111; 148/110; 148/112; 148/113; 148/120

(58) Field of Classification Search ................. None
See application file for complete search history.

(56) References Cited

U.S. PATENT DOCUMENTS 4,456,812 A * 6/1984 Neiheisel et al. ........ 219/121.85
4,645,547 A * 2/1987 Krause et al. ................ 148/111
4,750,949 A * 6/1988 Kobayashi et al. .......... 148/111
6,368,424 B1 * 4/2002 Sakai et al. .................. 148/111
7,045,025 B2 * 5/2006 Hamamura et al. ......... 148/308

FOREIGN PATENT DOCUMENTS

EP    0870843 A1    10/1998
JP    59-197520    11/1984

(Continued)

*Primary Examiner*—John P. Sheehan
(74) *Attorney, Agent, or Firm*—Kenyon & Kenyon LLP

(57) ABSTRACT

The present invention provides a grain-oriented electrical steel sheet with an extremely low core loss by scanning by a small focused laser beam spot and a method of production of the same, that is, a grain-oriented electrical steel sheet improved in electrical characteristics by scanning by a continuous wave fiber laser of the $TEM_{00}$ mode with a wavelength $\lambda$ of $1.07 \leq \lambda \leq 2.10$ μm substantially perpendicular to the steel sheet rolling direction and at substantially constant spacing and a method of production of the same, wherein a rolling direction focused spot diameter d (mm) of the irradiated beam, a linear scan rate V (mm/s) of the laser beam, an average output P (W) of the laser, a width of the formed laser scribing traces or with of the electrical domains Wl (mm), and a rolling direction Pl (mm) of the laser scribing traces are in the following ranges:

$0 < d \leq 0.20$ $0.001 \leq P/V \leq 0.012$ $0 < Wl \leq 0.20$ $1.5 \leq Pl \leq 11.0$.

7 Claims, 12 Drawing Sheets

FOREIGN PATENT DOCUMENTS

| JP | 3-69968 | 11/1991 |
| JP | 6-19112 | 3/1994 |
| JP | 7-220913 | 8/1995 |
| JP | 10-204533 | 8/1998 |
| JP | 2001-15834 | 1/2001 |
| JP | 2002-12918 | 1/2002 |

* cited by examiner

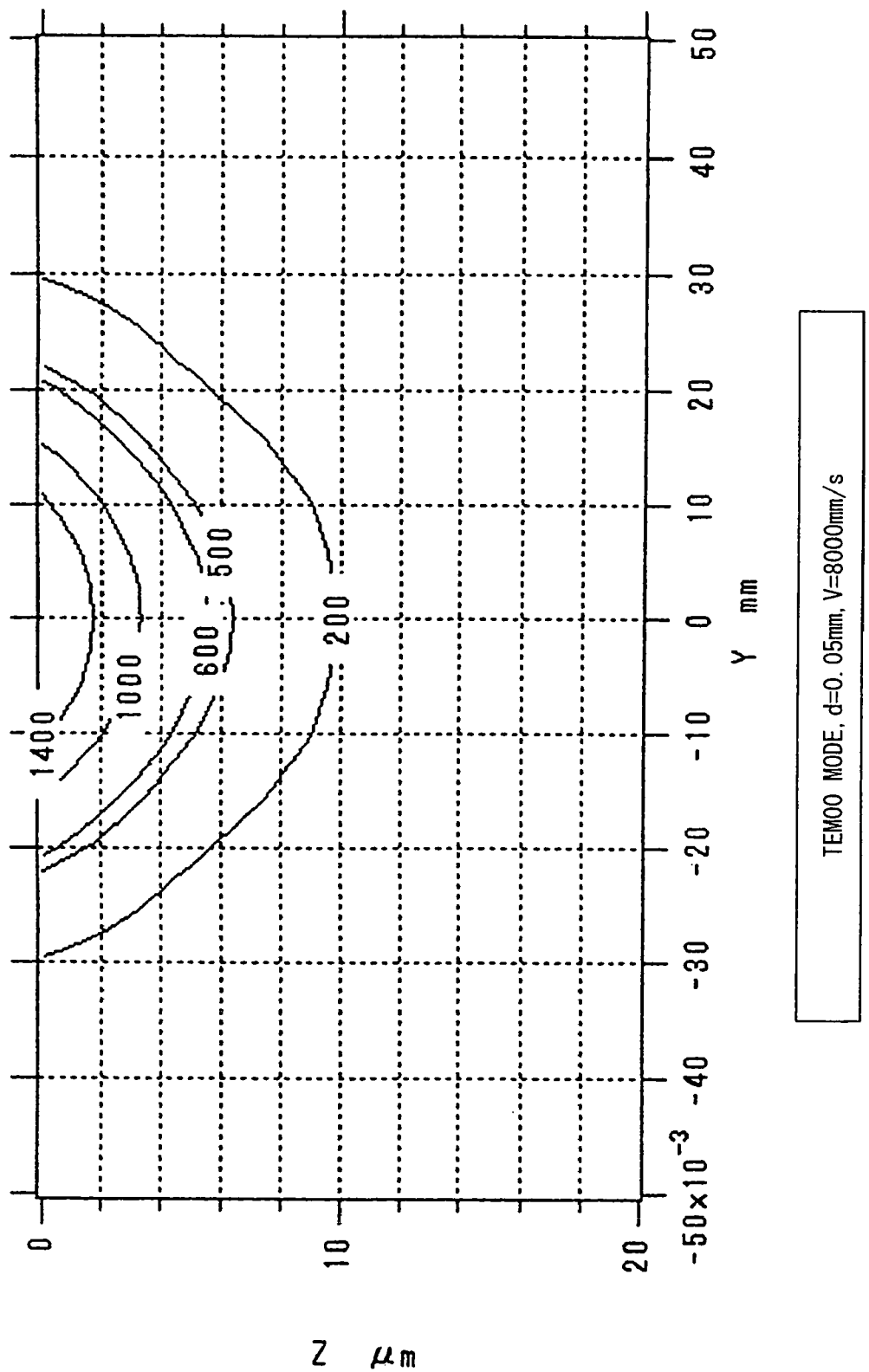

TEM00 MODE, d=0.05mm, V=4000mm/s

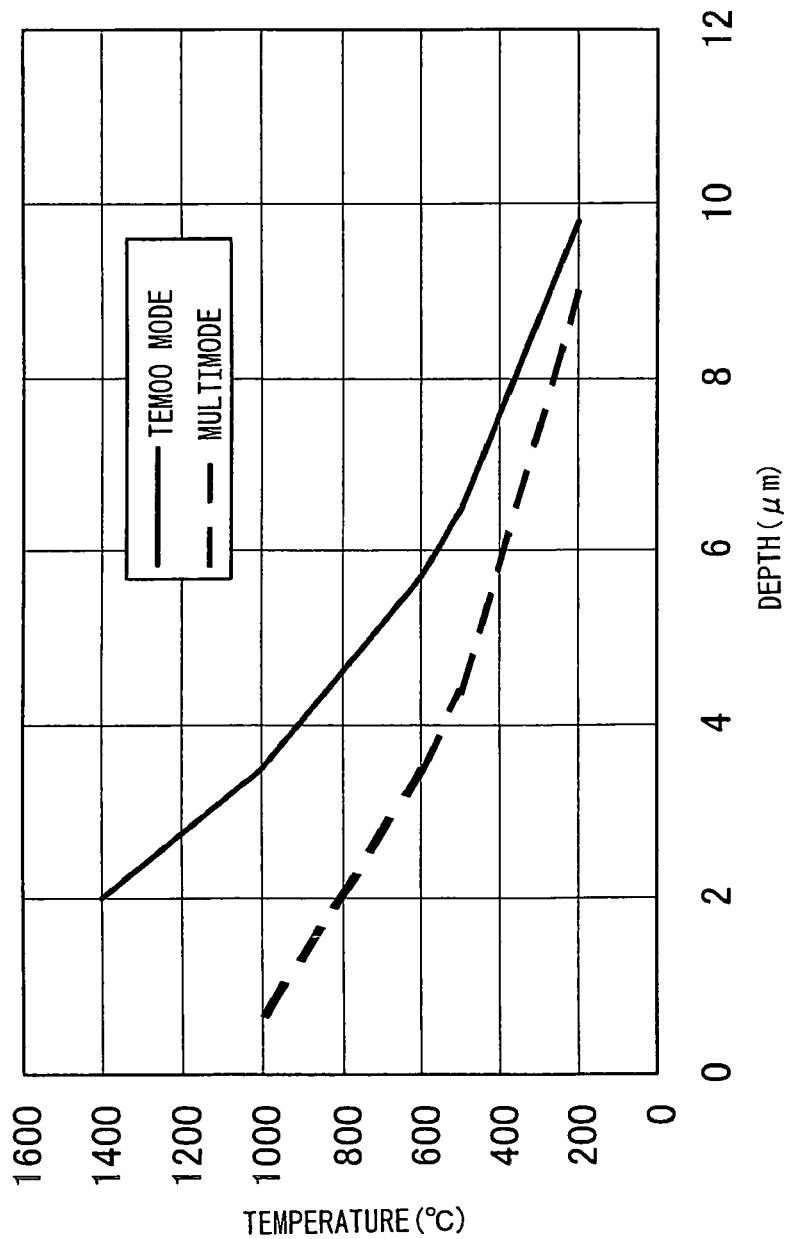

0.05mm

180° MAGNETIC DOMAIN WALL SPACING

CLOSURE DOMAIN WIDTH: W1

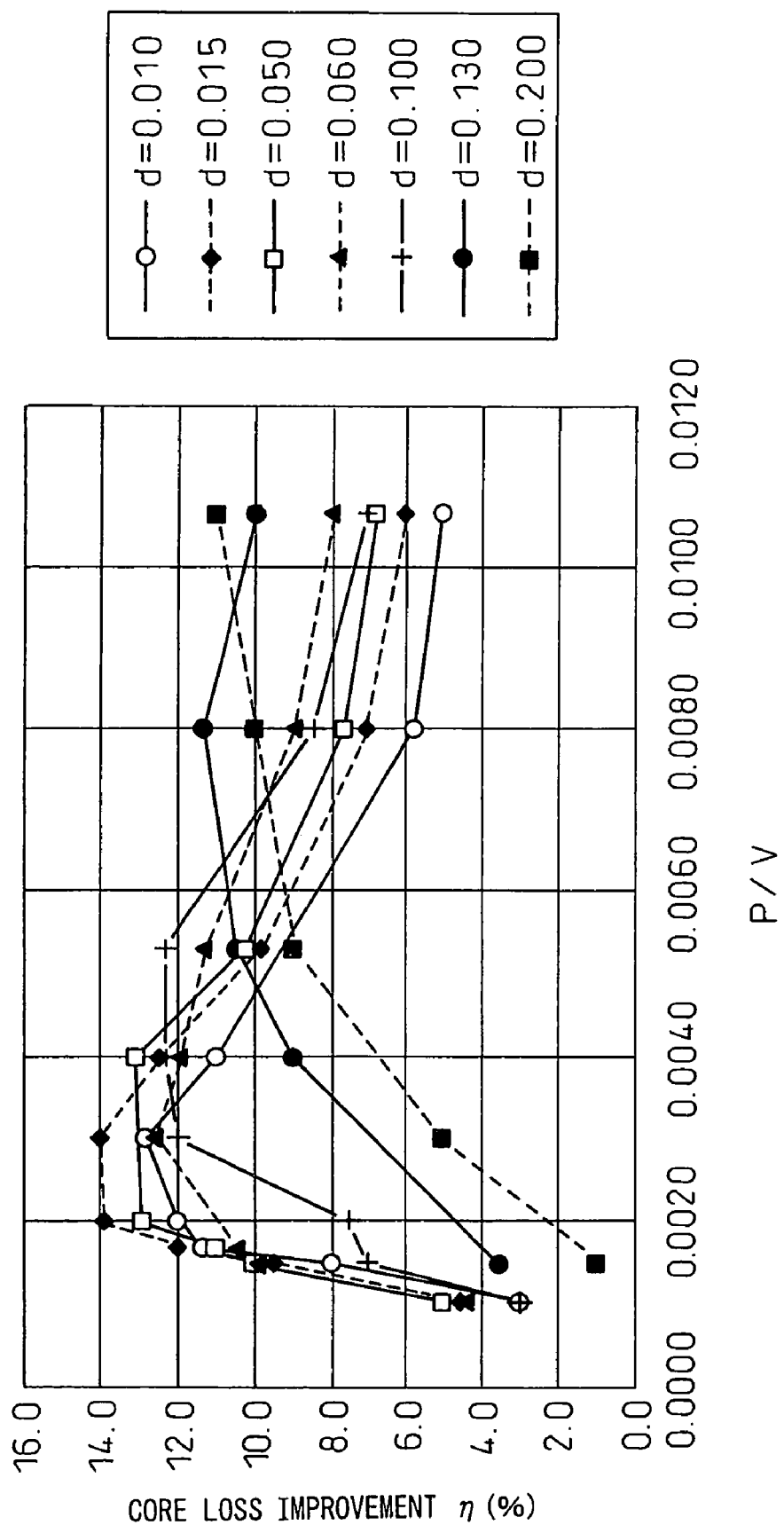

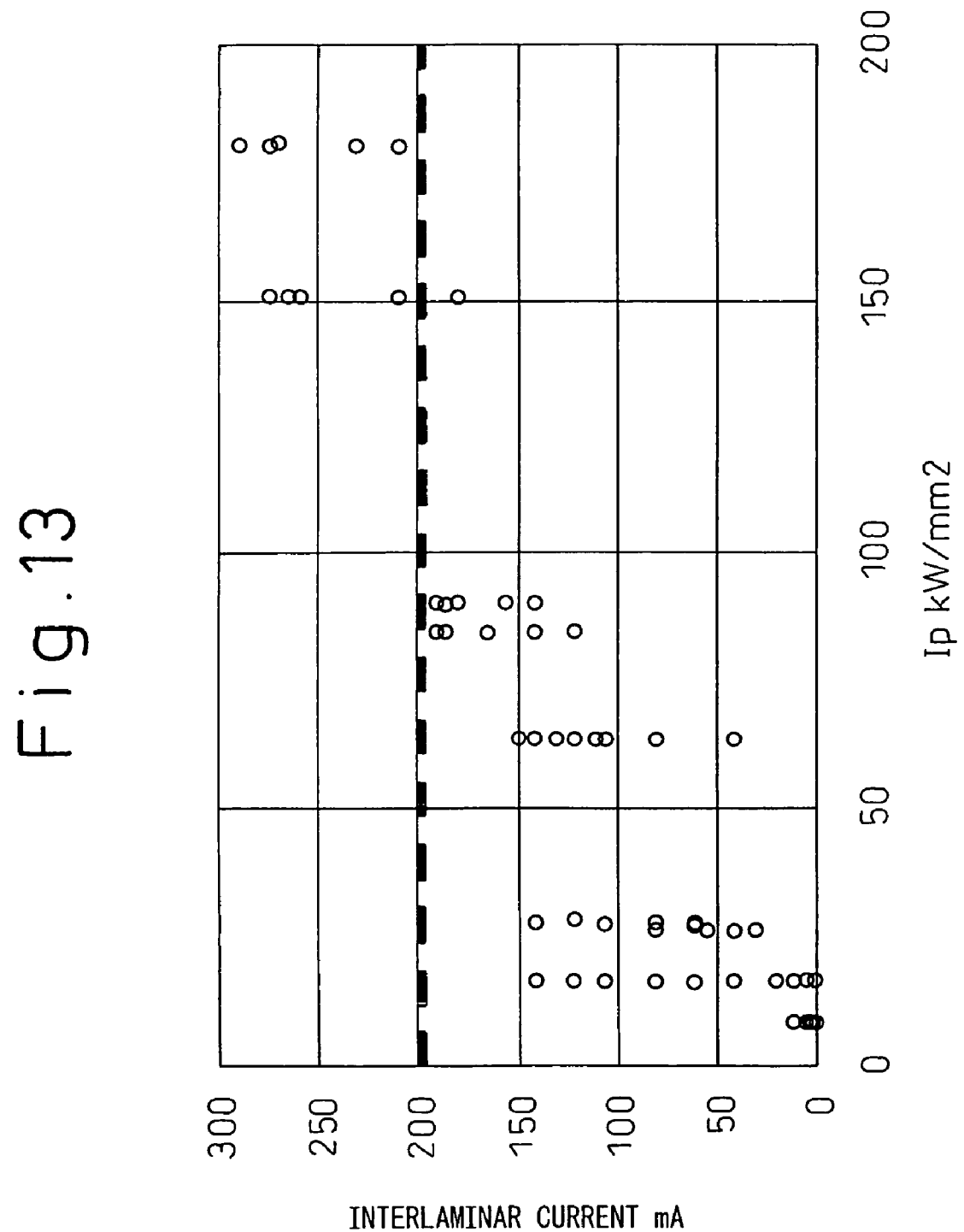

GRAIN-ORIENTED ELECTRICAL STEEL SHEET SUPERIOR IN ELECTRICAL CHARACTERISTICS AND METHOD OF PRODUCTION OF SAME

TECHNICAL FIELD

The present invention relates to a grain-oriented electrical steel sheet superior in electrical characteristics and a method of production of the same.

BACKGROUND ART

Grain-oriented electrical steel sheets with electrical easy axes oriented in the rolling direction are being used as transformer core materials. As a method of production of such a grain-oriented electrical steel sheet, Japanese Patent Publication (B) No. 6-19112 discloses the method of irradiating a YAG laser substantially perpendicular to the rolling direction to introduce periodic linear stress fields in the rolling direction and thereby reduce the core loss. The principle of this method is that the closure domains formed due to the surface stress caused by scanning by the laser beam finely refine the 180° electrical domain wall spacing and that abnormal eddy current loss is reduced. This is called "electrical domain refinement".

In the past, various methods have been disclosed regarding this technology. For example, Japanese Patent Publication (A) No. 6-57333 discloses a method of using a periodic-pulse $CO_2$ laser, while Japanese Patent Publication (B) No. 6-19112 discloses a method of using a continuous wave YAG laser and defining the irradiated beam spot diameter, power, scan rate, etc. so that no surface scribing traces occur. In each method, it is disclosed that by limiting the irradiating conditions to specific ranges, the core loss improvement (i.e. reduction) is enhanced. These methods are currently being put to actual use. However, the need for reduction of the core loss of transformer cores remains high. Further, a method of producing low core loss electrical steel sheet at a high efficiency has been desired.

"Core loss" is mainly the total of the classical eddy current loss, abnormal eddy current loss, and hysteresis loss. Classical eddy current loss is loss substantially determined by the sheet thickness. The loss changing due to the laser electrical domain refinement is the abnormal eddy current loss and hysteresis loss. The closure domains imparted by laser electrical domain refinement finely refine the 180° electrical domain wall spacing and reduce the abnormal eddy current loss, but become factors causing the hysteresis loss to increase. Accordingly, forming closure domains as narrow as possible in the rolling direction keeps down the increase in the hysteresis loss and results in the total core loss becoming lower. However, if closure domains are too narrow, the effect of refining the electrical domains becomes small, As a result, as described in Japanese Patent Publication (B) No. 6-19112, when using a YAG laser, if making the irradiated beam spot diameter extremely small, even if adjusting the linear scan rate or laser power of the laser beam, there was the problem that a significant effect of improvement of the core loss could not be obtained.

DISCLOSURE OF THE INVENTION

An object of the present invention is to provide a grain-oriented electrical steel sheet reduced sharply in core loss by scanning by a small focused laser beam spot and a method of production of the same. Its gist is as follows:

(1) A method of production of a grain-oriented electrical steel sheet superior in electrical characteristics improving the core loss characteristic by forming linear closure domains substantially perpendicular to the rolling direction of the steel sheet and at substantially constant line spacing by scanning with a continuous wave laser beam, the method of production of grain-oriented electrical sheet characterized in that the laser is of a $TEM_{00}$ mode with an intensity profile of the laser beam in a cross-section perpendicular to the direction of beam propagation having a maximum intensity near the center of the optical axis and in that the focused beam spot diameter in rolling direction d (mm) of the irradiated beam, a linear scan rate V (mm/s) of the laser beam, and an average output P (W) of the laser are in the following ranges:

$0 < d \leq 0.2$ $0.001 \leq P/V \leq 0.012$ (2) A method of production of a grain-oriented electrical steel sheet superior in electrical characteristics as set forth in (1), characterized in that the d, V, and P are in the following ranges:

$0.010 \leq d \leq 0.10$ $0.001 \leq P/V \leq 0.008$ (3) A method of production of a grain-oriented electrical steel sheet superior in electrical characteristics as set forth in (1), characterized in that the d, V, and P are in the following ranges:

$0.010 < d \leq 0.060$ $0.002 \leq P/V \leq 0.006$ (4) A method of production of a grain-oriented electrical steel sheet superior in electrical characteristics as set forth in (1), characterized in that the d, V, and P are in the following ranges:

$0.010 < d < 0.040$ $0.002 \leq P/V \leq 0.006$ (5) A method of production of a grain-oriented electrical steel sheet superior in electrical characteristics as set forth in any one of (1) to (4), characterized in that when the focused beam spot diameter in rolling direction is d, the spot diameter in the direction perpendicular to that is dc, and the laser average output is P, the instantaneous peak power density Ip ($kW/mm^2$) is defined as $Ip = P/(d \times dc)$ and the range of Ip is $0 < Ip \leq 100 \ kW/mm^2$.

(6) A method of production of a grain-oriented electrical steel sheet superior in electrical characteristics as set forth in any one of (1) to (4), characterized in that the laser apparatus is based on a continuous wave fiber laser apparatus with an emission wavelength λ of $1.07 \leq \lambda \leq 2.10 \ \mu m$.

(7) A method of production of a grain-oriented electrical steel sheet superior in electrical characteristics as set forth in (6), characterized in that the laser apparatus is a continuous wave fiber laser with an average output of 10 W or more.

(8) A grain-oriented electrical steel sheet superior in electrical characteristics improving the core loss characteristic by forming linear closure domains substantially perpendicular to the rolling direction of the steel sheet and at substantially constant line spacing by scanning with a continuous wave laser beam, the grain-oriented electrical sheet characterized in that a rolling direction width Wl of a laser beam scribing trace and/or linear closure domain is $0 < Wl \leq 0.2$ mm.

(9) A grain-oriented electrical steel sheet superior in electrical characteristics as set forth in (8), characterized in that a rolling direction width Wl of a laser beam scribing trace and/or linear closure domain is $0.01 \leq Wl \leq 0.1$ mm.

(10) A grain-oriented electrical steel sheet superior in electrical characteristics as set forth in (8), characterized in that a rolling direction width Wl of a laser beam scribing trace and/or linear closure domain is $0.01 \leq Wl \leq 0.04$ mm.

(11) A grain-oriented electrical steel sheet superior in magnetic characteristics as set forth in any one of (8) to (10), characterized in that a rolling direction line spacing Pl of the laser beam linear scribing trace and/or linear closure domains is $1.5 \leq Pl \leq 11.0$ mm

(12) A grain-oriented electrical steel sheet superior in magnetic characteristics as set forth in any one of (8) to (10), characterized in that a rolling direction line spacing Pl of the laser beam linear scribing trace and/or linear closure domains is $3.0 \leq Pl \leq 7.0$ mm.

BRIEF DESCRIPTION OF THE DRAWINGS

FIG. 5 is a view of the results of calculation of the temperature profile near the surface of the steel sheet due to focusing and irradiating of a $TEM_{00}$ mode beam in the scope of the present invention.

FIG. 8 is a view of results of calculation of the temperature profile of FIG. 5 and FIG. 7 compared with the change in temperature in the depth direction at the beam center.

FIG. 9(a) is an optical micrograph of the surface showing a typical laser scribing trace of the present invention, while

FIG. 10 is a view of the relationship between core loss improvement and the P/V.

FIG. 13 is a view of the relationship between the Ip and the interlayer current after coating.

BEST MODE FOR WORKING THE INVENTION

Below, embodiments will be used to explain the effects of the present invention and the reasons for manifestation of those effects.

Figure 2:
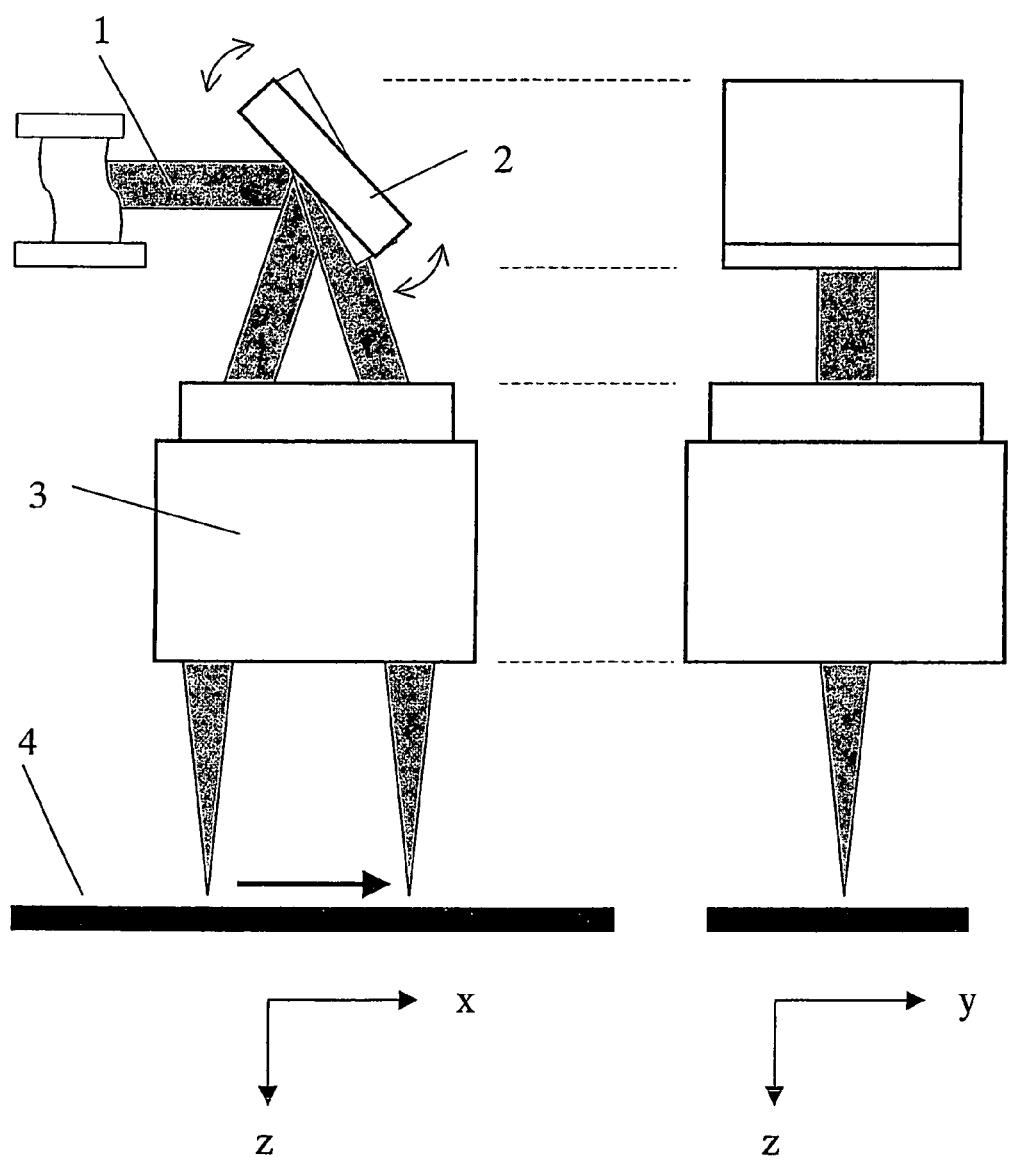
FIG. 2 is an explanatory view of the laser irradiating method according to the present invention.

FIG. 2 is a view explaining the method of irradiating a laser beam according to the present invention. A laser beam 1 is output from a not shown fiber laser apparatus. A "fiber laser" is a laser apparatus which uses a semiconductor laser as an excitation source and where the fiber core itself emits the light. The output beam diameter is restricted by the diameter of the fiber core.

Figure 4:
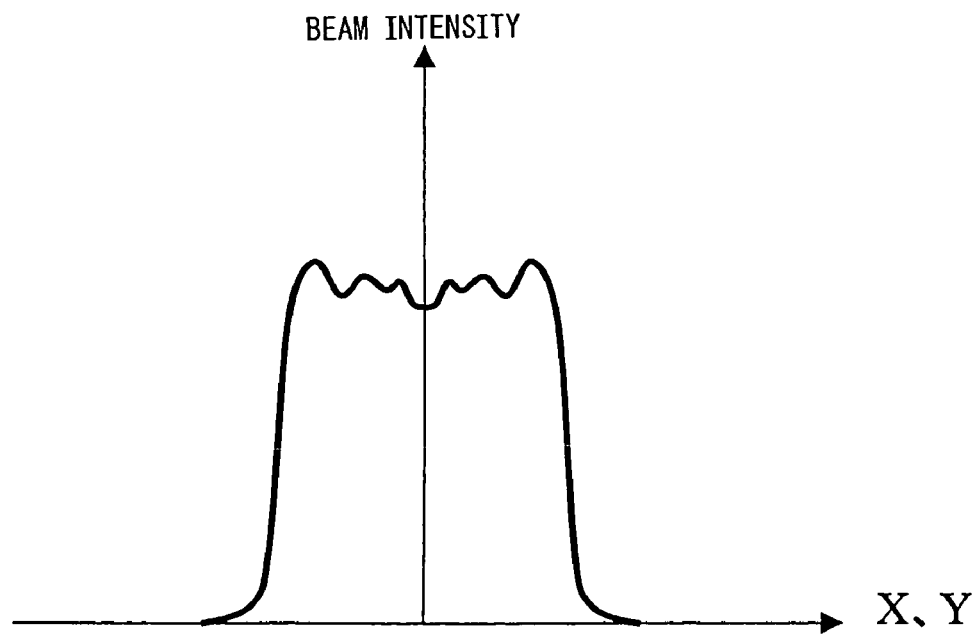
FIG. 4 is a schematic view of a multi-mode.

In this regard, the laser beam output from a laser resonator is a superposition of beam modes having various intensity profiles as determined by the wavelength, diameter of the active media, curvature of the resonator mirror, etc. These modes are expressed by different order Gaussian modes. The larger the cross-section of the beam able to be generated in a resonator, the higher order the mode generated up to. A commonly used YAG laser etc. can generate this plurality of modes simultaneously, so its beam is called a "multi-mode beam". FIG. 4 shows a typical multi-mode intensity profile.

Figure 3:
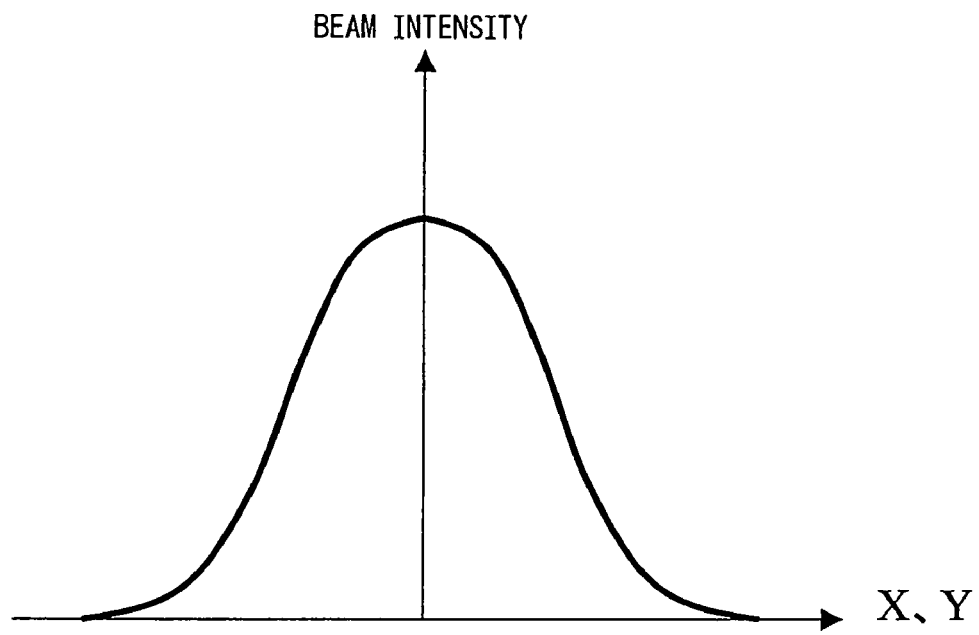
FIG. 3 is a schematic view of a $TEM_{00}$ mode.

On the other hand, in the case of a fiber laser, by using a single mode fiber with a fiber core diameter of about 0.01 mm, the modes which can be generated are restricted and single mode generation at the lowest order can be easily realized. This mode substantially corresponds to the Gaussian profile and is generally referred to as the $TEM_{00}$ mode. The $TEM_{00}$ mode, as shown in FIG. 3, is a Gaussian profile having a maximum intensity centered along the optical axis. When focusing this beam, even the focused point has the same intensity profile.

As an indicator of the mode of a beam, a beam quality factor $M^2$ is used. The theoretically calculated value of $M^2$ of the $TEM_{00}$ mode is 1.0. As the order of the mode becomes higher, $M^2$ increases. The $M^2$ of a beam obtained by the above-mentioned single mode fiber laser is not more than 1.1 or is substantially the ideal $TEM_{00}$ mode. The $M^2$ value of a commonly used multi-mode YAG laser etc. is 20 or more. Therefore, the $TEM_{00}$ mode of the laser beam used in the present invention includes a mode where the intensity profile is a substantially Gaussian profile. The $M^2$ value corresponds to 2 or less.

In an embodiment of the present invention, the $TEM_{00}$ mode laser beam 1 output from the fiber laser apparatus, as shown in FIG. 2, is made to scan along the X direction of the grain-oriented electrical steel sheet 4 by using a scan mirror 2 and an fθ lens 3. Note that the "X direction" is the direction substantially perpendicular to the rolling direction of the grain-oriented electrical steel sheet. The beam spot diameter d at the focused point is about 0.05 mm. The "beam spot diameter" is defined as the beam spot diameter at which 86% of the laser power is contained. The linear scan rate V of the beam is 3000 to 16000 mm/s. The laser average output is fixed at 32 W. Further, rolling direction irradiating Pl is 5 mm.

Figure 1:
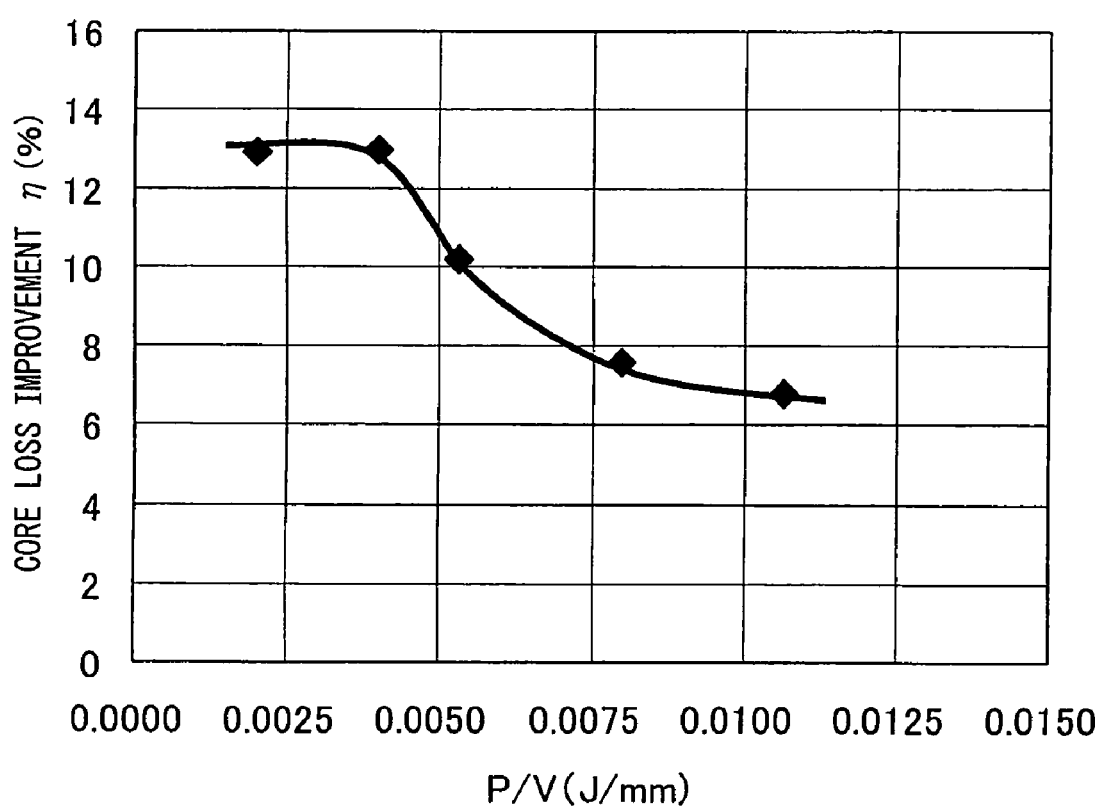
FIG. 1 is a graphical representation of the dependency of core loss improvement on the parameter of the ratio of the power and scan rate.

The stress fields generated by the laser irradiating may be considered to be dependent on the density of the energy input to the surface of the steel sheet, so the inventors took note of the P/V (J/mm) between the laser average output P (W=J/s), a parameter proportional to the input energy density in beam scanning, and the scan rate V (mm/s). FIG. 1 shows results of an experiment investigating the relationship between the P/V and rate of improvement of the core loss in the present embodiment. The core loss improvement η, the rate of improvement of the core loss, is defined by the following equation from the core loss values $W_{17/50}$ (W/kg) before and after laser irradiating.

$\eta = \{(W_{17/50}$ before laser irradiating$-W_{17/50}$ after laser irradiating$)/W_{17/50}$ before laser irradiating$\} \times 100$ (%)

Here, $W_{17/50}$ is the value of the core loss at a magnetic field strength of 1.7 T and a frequency of 50 Hz. The thickness of the sample of the grain-oriented electrical steel sheet used in the present embodiment is 0.23 mm. The range of $W_{17/50}$ before laser irradiating is 0.85 to 0.90 W/kg.

From FIG. 1, it is learned that at the $TEM_{00}$ mode with a focused spot diameter d of 0.05 mm, when the P/V is in the range of 0.0065 J/mm or less, that is, under high speed scanning conditions where the linear scan rate V is over 5000 mm/s, core loss improvement particularly increases and a high value over 8% is obtained. On the other hand, with this focused spot diameter, under conditions of a value of P/V of 0.0065 J/mm or more and a scan rate of 5000 mm/s or less, core loss improvement tends to fall. The surface of steel sheet was examined in detail under such conditions, whereupon it was found that the laser irradiated regions melted and resolidified. At such resolidified regions, an excessive tensile stress is generated, so the hysteresis loss remarkably increases.

Therefore, according to the method of the present invention, a superior core loss is obtained even in a region of a very small focused beam spot diameter of 0.05 mm or so where the core loss deteriorated in the past even if adjusting the laser average output and scan rate. Further, since a rate of improvement of the core loss greater than the past is obtained at a range of power lower than or a range of scan rate higher than the conditions disclosed as optimal in the prior art using an equivalent level of a small focused beam spot diameter (Japanese Patent Publication (B) No. 06-19112), not only are the characteristics superior, but also a high efficiency, high speed process can be realized.

The reason why the method of the present invention enables such superior characteristics and efficiency to be obtained is understood as follows.

The ideal of magnetic domain refinement is to suppress an increase in hysteresis loss in closure domains narrow in the rolling direction and to give strength to the narrow closure domains sufficiently to enable refining of the 180° magnetic domain. The source of the closure domains is the stress fields caused by the laser irradiation. The inventors believed that the stress fields was due to the temperature profile near the surface of the steel sheet and in particular was dependent on the temperature to be reached and the temperature gradient. Further, they believed that the spatial profile of the temperature of the laser irradiated regions was affected by the spatial intensity profile of the laser beam. Therefore, they considered the beam modes and estimated the temperature profile of laser irradiated regions under steady conditions in the case of scanning by a continuous wave laser by using a heat conduction simulation. The calculation parameters here are the beam mode, laser average output P, and linear scan rate V.

Figure 6A:
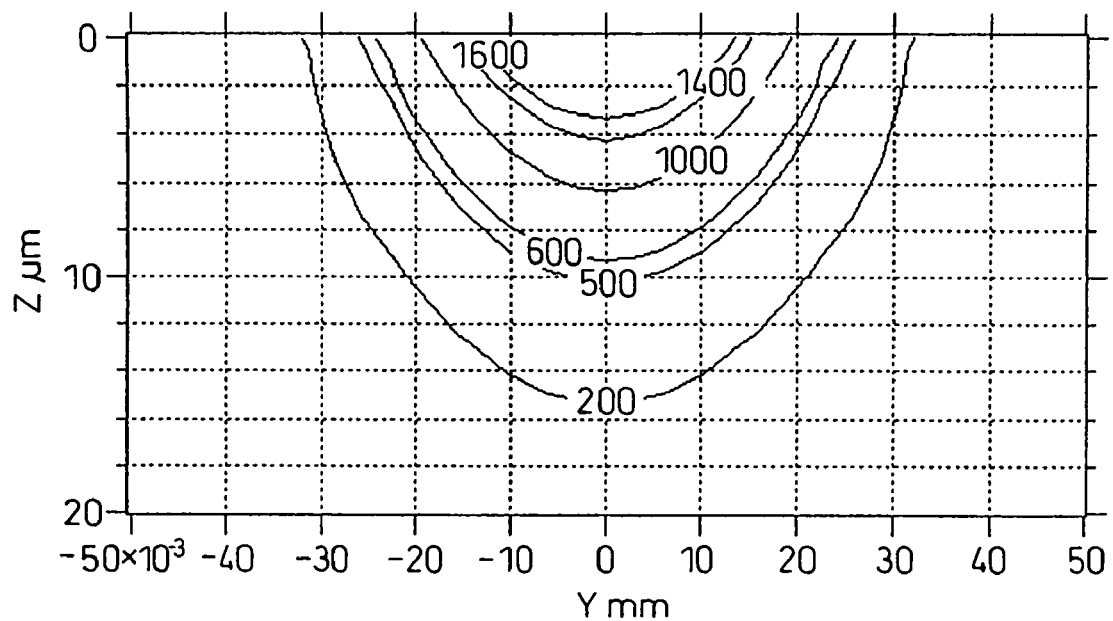
FIG. 6(a) is a view of the results of calculation of the temperature profile near the surface of the steel sheet due to focusing and irradiating of a $TEM_{00}$ mode beam in the scope of the present invention in the case where the P/V is relatively high.
Figure 6B:
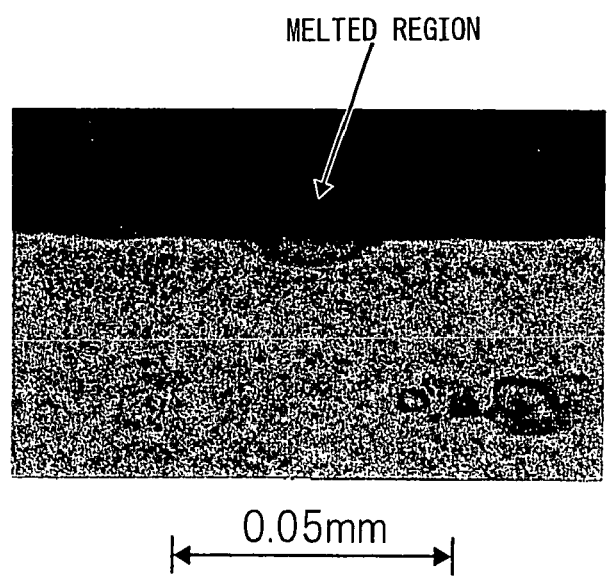
FIG. 6(b) is a cross-sectional micrograph of a steel sheet under the laser irradiating conditions of FIG. 6(a).
Figure 7:
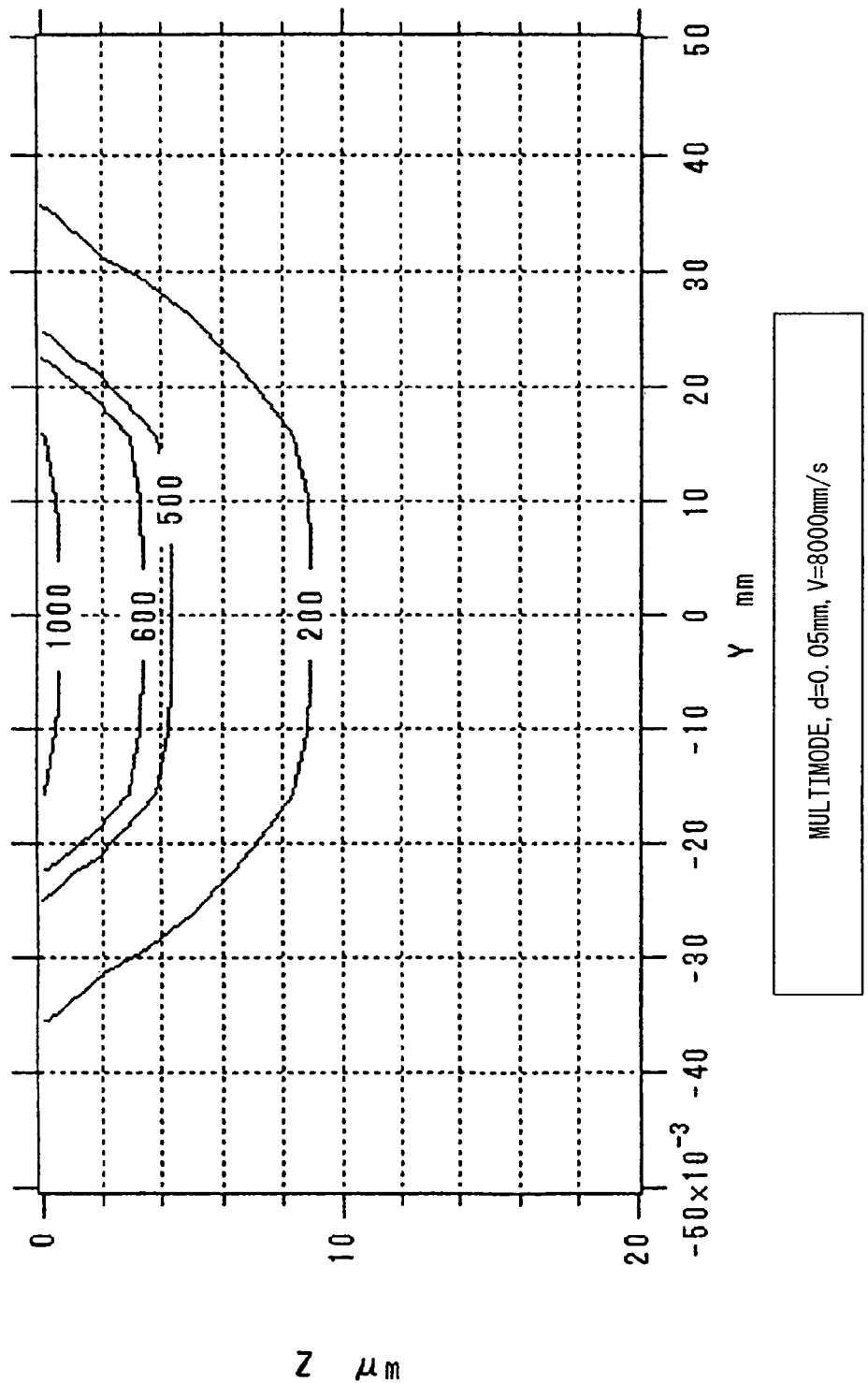
FIG. 7 is a view of the results of calculation of the temperature profile near the surface of the steel sheet due to focusing and irradiating of a multi-mode beam.

FIG. 5 shows the results of calculation of the temperature profile at conditions corresponding to the conditions of the present invention, that is, a $TEM_{00}$ mode, a focused spot diameter d of 0.05 mm, an average output of 32 W, and a linear scan rate of 8000 mm/s. Further, the coordinates x, y, z correspond to the coordinates shown in FIG. 2. FIG. 6(a) shows the results of calculation of the temperature profile under conditions of a linear scan rate V=4000 mm/s and P/V=0.008. Note that the rest of the conditions are the same as in FIG. 5. Further, FIG. 6(b) is a micrograph of a cross-section of a sample of a steel sheet obtained under these experimental conditions and reveals a melted region at the surface. FIG. 7 shows the results of calculation in the case of a multi-mode. The rest of the conditions are the same as in FIG. 3. Melted regions are seen at the surface. Further, FIG. 8 shows results of a comparison of the results of calculation of FIG. 5 and FIG. 7 with the change in temperature in the depth direction at the beam center.

From the comparison of FIG. 5 and FIG. 7 and from FIG. 8, even when the focused spot diameters are the same, the spacing between isotherms are narrower and the gradient of the temperature profile is greater in the case of the $TEM_{00}$ mode compared with the multi-mode. Further, it is deduced that the depth of penetration of the high temperature regions of the 600° C. level is shallow and the high temperature regions concentrate near the beam center. According to experiments of the inventors, if annealing a steel sheet refined in magnetic domains by laser irradiating to remove stress at a temperature of 500° C. or more, the effect of magnetic domain refinement ends up being lost. Therefore, at the time of laser irradiating, it seemed necessary to go through a temperature history of this temperature or more. The isotherms of this temperature region are believed to affect the shape of the closure domains. Further, the sharper the temperature gradient, the greater the amount of stress, so in the case of the $TEM_{00}$ mode strong stress seems to be formed in narrow regions. As a result, in the present invention using the $TEM_{00}$ mode, compared with the commonly used multi-mode, closure domains sufficient for refining magnetic domains in narrow deep spaces are obtained even with a very small focused beam spot. Such an ideal magnetic domain refinement becomes possible for the first time in this invention.

On the other hand, when P/V increases as a result of the high power or low scan rate, as shown in FIG. 6, the surface temperature is predicted to exceed melting point of the steel sheet, 1600° C., in some regions. This finding matches relatively well with the cross-section of a molten sample obtained by experiments. Combined with results of other calculations, the accuracy of prediction of the temperature profile is high. If melted regions occur in this way, as mentioned before, a large tensile stress occurs in the process of resolidification of the melted regions. This region is supposed to form an extremely wide range of stress fields, that is, closure domains. As a result, the hysteresis loss starts to increase, so the overall core loss tends to deteriorate.

Based on the above consideration, the inventors engaged in detailed experiments and studies on using small focused beam spot to form narrow closure domains, the focused spot diameter giving a superior core loss, and the closure domain widths, and the ranges of power and linear scan rate. FIG. 10 shows the results of investigation of the relationship between core loss improvement and P/V when changing the beam spot diameter in rolling direction d from 0.010 mm to 0.200 mm. Here, the rolling direction irradiation line spacing Pl is 5 mm. From these results, in the $TEM_{00}$ mode, it is found that core loss improvement is seen in wide ranges of d and P/V. In particular, when d is small, it is found that a higher improvement is obtained with a lower P/V. A higher core loss improvement is obtained in a range of $0 < d \leq 0.20$ mm when $0.001 \leq P/V \leq 0.012$ J/mm. Further, by setting the upper limit of d to preferably 0.1, 0.08, 0.06, 0.04, 0.03, and 0.02 mm and the lower limit to preferably 0.005 and 0.010 mm, a higher core loss improvement is obtained. In combination with P/V, if further limiting the laser irradiating to preferably $0.001 \leq P/V \leq 0.008$ J/mm in the range of $0.010 \leq d \leq 0.10$ mm or $0.002 \leq P/V \leq 0.006$ J/mm in the range of $0.010 < d \leq 0.060$ mm, a higher core loss improvement is obtained. A higher core loss improvement is obtained by a relatively small laser beam focused spot diameter, which is understood because of suppressed hysteresis loss as described in detail above.

Further, the optimum range of P/V in the above-mentioned ranges of d will be explained as follows. The lower limit of P/V is the value required for inputting sufficient power for formation of closure domains. On the other hand, the upper limit of P/V is the value just before the power density excessive to cause remarkable surface melting. For example, in the range of a small beam spot diameter, the thermal profile becomes more local, so the core loss improvement becomes higher, but to avoid surface melting, it is preferable to suppress P/V to a smaller range.

Figure 9A:
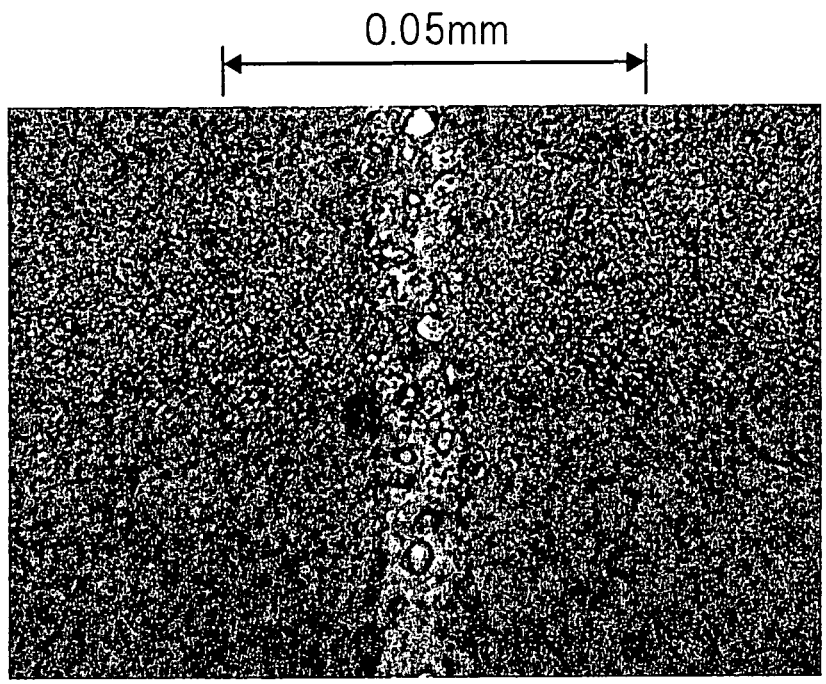
Figure 9B:
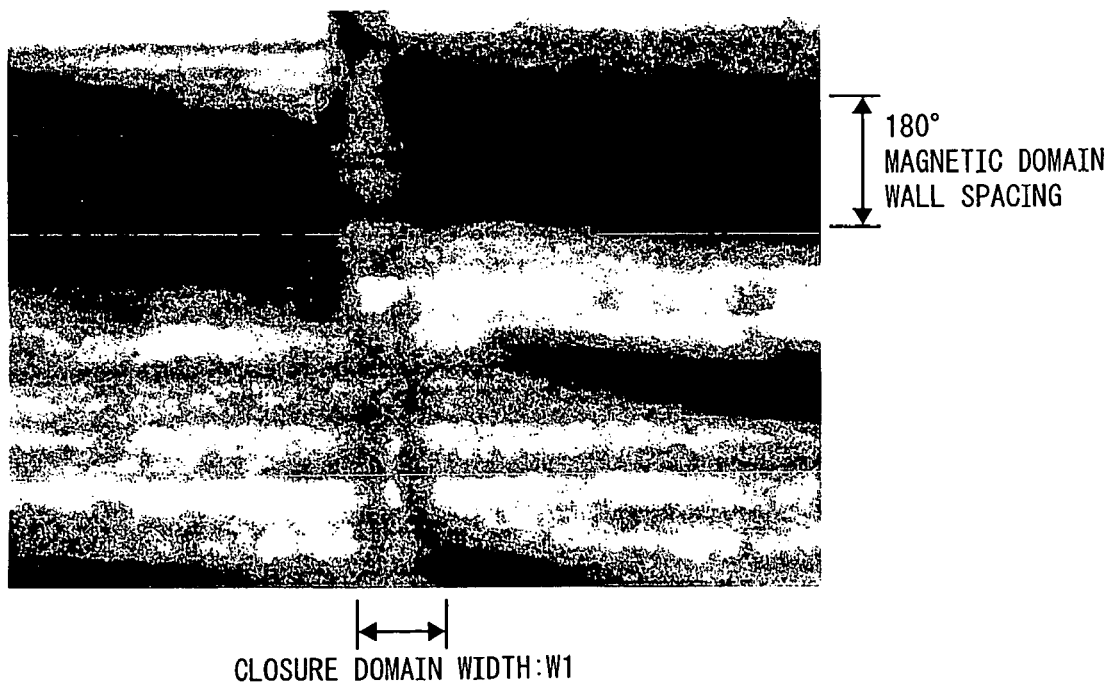
FIG. 9(b) is an SEM micrograph of the magnetic domain structure.
Figure 11:
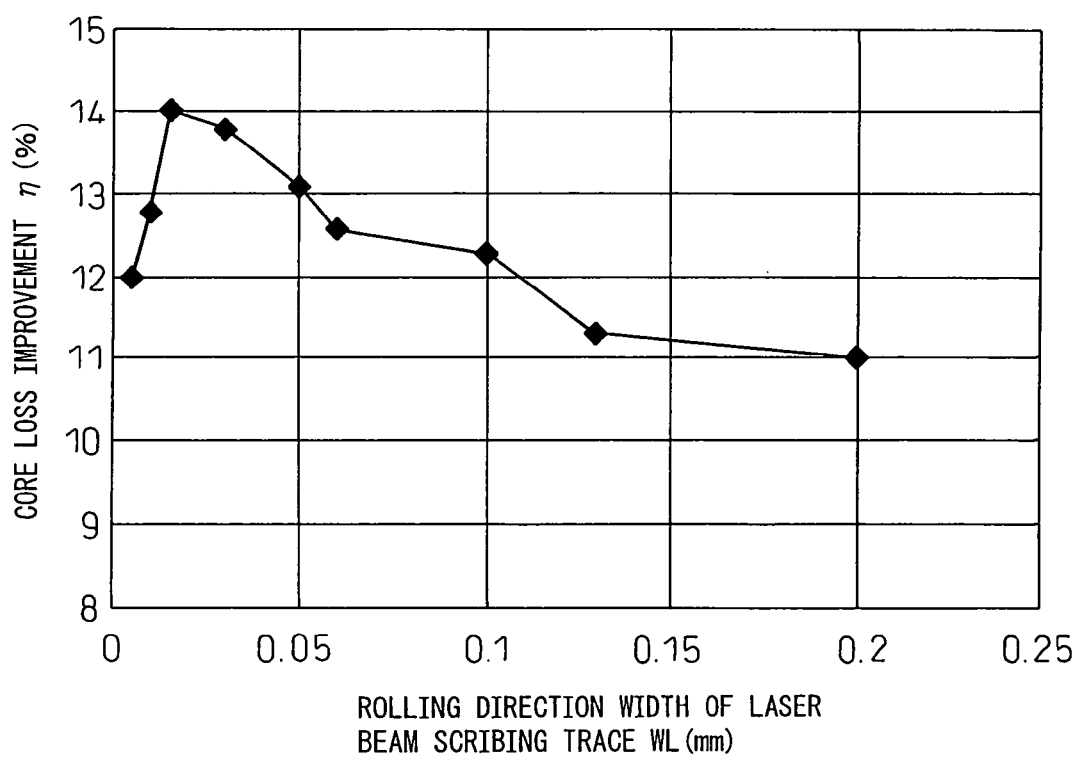
FIG. 11 is a view of the relationship between the Wl approximated by the laser scribing trace width and core loss improvement.

Further, when examining in detail the laser irradiated regions of a grain-oriented electrical steel sheet produced in the range of conditions of the present invention by a microscope and SEM for magnetic domain observation, it was found that laser scribing traces and closure domain widths Wl are formed substantially matching the irradiated beam spot diameter d. A micrograph of the laser scribing trace when the beam spot diameter d is 0.015 mm and a SEM micrograph of the closure domains are shown in FIG. 9. The results indicated that the beam spot diameter d well corresponded with the closure domain width Wl. FIG. 11 shows the results summarizing the highest core loss improvements at different Wl's assuming the laser scribing trace width to be Wl. When the range of Wl is less than 0.2 mm, particularly a range from 0.01 to 0.1 mm, a high core loss improvement is obtained. The lower limit of Wl is preferably 0.005 mm, more preferably 0.010 mm, while the upper limit is preferably 0.1 mm, more preferably 0.04 mm.

As explained above, it has been discovered that when the laser beam spot diameter is extremely small and the laser beam mode, power, and scan rate are limited in preferable range, a high core loss improvement is obtained. It has further been found that the range of power and scan rate in the prior art is not suitable but a lower power and higher scan rate are optimal for these superior characteristics.

Figure 12:
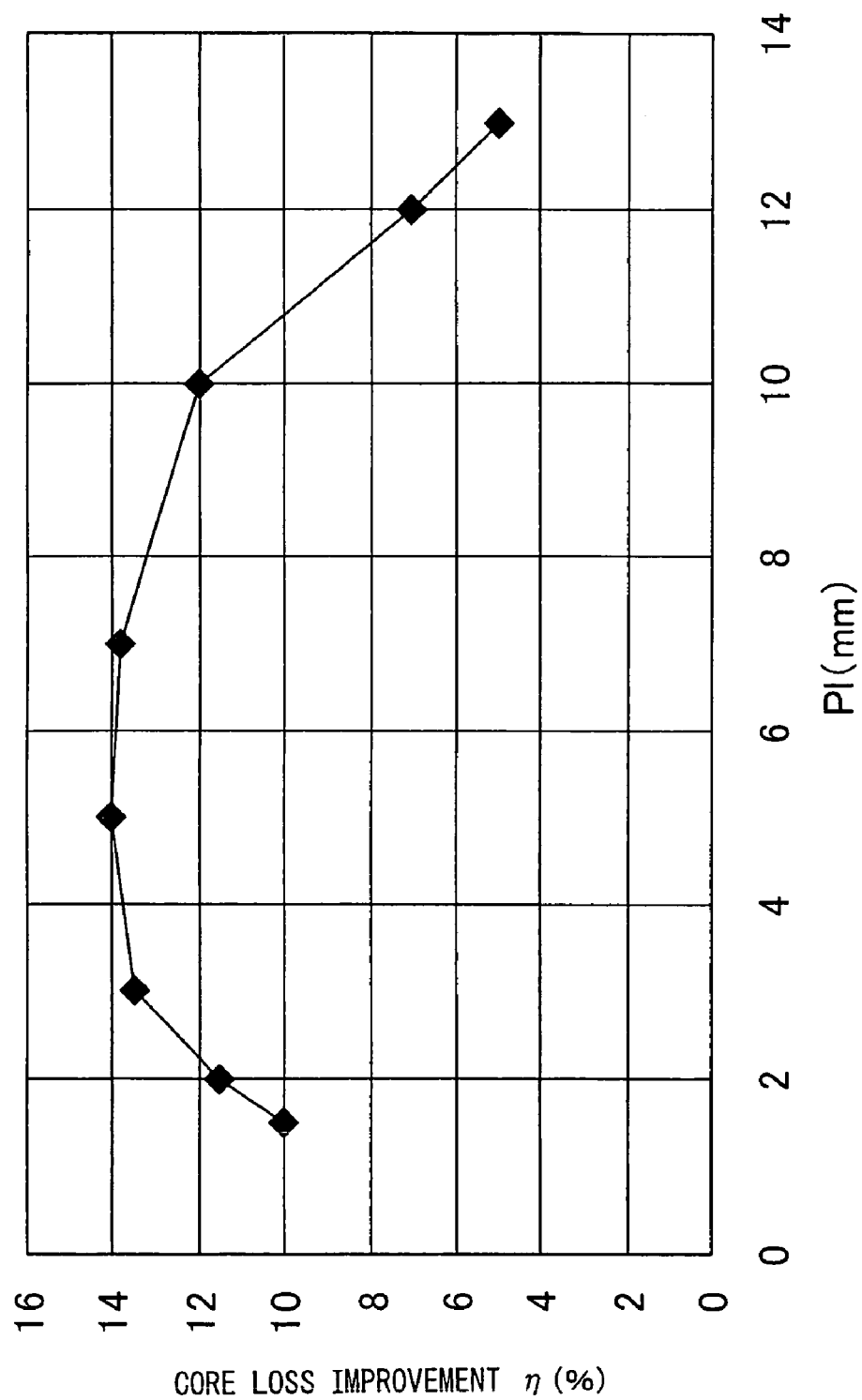
FIG. 12 is a view of the relationship between the rolling direction line spacing, the distance between two adjacent lines, Pl of the laser scribing traces and core loss improvement.

Further, it has been found that the rolling direction spacing of the laser scribing traces Pl also has an effect on the core loss improvement. FIG. 12 shows the change in core loss improvement when fixing P/V to 0.0030 and changing Pl from 1.5 to 13 mm at Wl=0.015 mm. If Pl is a too small value of 1.5 mm or less, while the increase in the hysteresis loss due to each closure domain is small, the number of the lines of closure domains formed on the steel sheet as a whole greatly increases, so the total hysteresis loss increases and the core loss deteriorates. On the other hand, if Pl is too large value of over 11 mm, the effect of refining the 180° magnetic domain becomes smaller, so the core loss again deteriorates. Therefore, a range of Pl from 1.5 mm to 11 mm is preferable. Further, a range of $3.0 \leq Pl \leq 7.0$ mm gives the highest core loss improvement relatively independent of Pl.

Next, the reason for use of a fiber laser as a method of production of the present invention will be explained.

The fiber laser used in the embodiment of the present invention is comprised of a quartz fiber with a core doped with Yb (Ytterbium) and generates a beam by excitation using a semiconductor laser. The emitted wavelength is 1.07 to 1.10 μm. The primary feature of the fiber laser is the wavelength between 1.06 μm of YAG laser and 10.6 μm of $CO_2$ laser which has been used for magnetic domain refinement of electrical steel sheet so far.

Further, the emission mode of a fiber laser is close to the single mode as explained above. The $M^2$ value of the beam quality factor is close to the theoretical limit of 1. This is an extremely superior feature when compared with the $M^2$ value of 20 or more of a commonly used YAG laser.

The focused beam spot decreases with decreasing values of $M^2$ or wavelength of the beam. Here, the minimum focused spot diameter dm to which a laser beam can be focused is expressed by the following equation assuming the wavelength to be λ, focal distance of the focusing lens to be f, and the diameter of the beam incident on the lens to be D:

$$dm = M^2 \times (4/\pi) \times f \times \lambda / D.$$

Therefore, a fiber laser enables a smaller focused spot diameter compared with a YAG laser with large $M^2$ value or $CO_2$ laser with a long wavelength λ. This is the secondary feature of a fiber laser in magnetic domain refinement.

Considering the two characteristics mentioned above, the inventors arrived at an invention using a fiber laser. The inventors took note of the facts that a grain-oriented electrical steel sheet is covered at its surface with a ceramic-like coating and that this coating has an better absorption of the wavelengths from 1 μm to the longer side of 10 μm band. Accordingly, if utilizing a Yb doped fiber laser with a wavelength longer than that of a YAG laser, the laser power absorbed in the steel sheet can be increased and more efficient magnetic domain refinement are obtained. Further, since small focused beam spot has been achieved utilizing fiber laser, the technology of the present invention is suitable to produce grain-oriented electrical steel sheet with extremely small closure domains of Wl<0.2 mm which is one of the characteristics of the present invention. Further, although the wavelength of a fiber laser is less absorbed at the surface of grain-oriented electrical steel compared with that of a $CO_2$ laser, it is difficult to obtain a focused spot diameter of 0.2 mm stably in practice utilizing long wavelength $CO_2$ laser, so again the technology of the invention is much more advantageous compared with use of a $CO_2$ laser. Therefore, in industrial practice of the present invention, it is possible to stably and efficiently produce an electrical steel sheet with desired characteristics using a fiber laser.

As a type of fiber laser, a fiber laser with a core doped with Er (erbium) has an emission wavelength near 1.55 μm, while a fiber laser doped with Tm (thulium) has an emission wavelength of 1.70 to 2.10 μm. The method of use of either fiber laser falls under the method of the present invention for above mentioned reason.

Further, for the method of the present invention, a fiber laser easily giving a high output $TEM_{00}$ mode laser beam is optimal, but any laser apparatus giving a mode close to the $TEM_{00}$ and a wavelength absorbed at the surface of the steel sheet may be used in the present invention.

Note that the embodiment of the present invention represents a circular focused beam spot with a diameter d, but as explained above, the condition required for ideal magnetic domain refinement is a narrow rolling direction width of the closure domains, so if the rolling direction beam spot diameter d is in the range of the present invention, the beam scan direction spot diameter may be different from d as well. For example, the beam may be an elliptical one with a beam spot diameter in the scan direction longer than d. As a result, a method where laser irradiated scribing traces are not caused at the surface of the steel sheet is also included in the present invention.

Since the laser irradiating method of the present invention gives a high beam strength near the center as compared with conventional method, sometimes the laser irradiated region may show uneven surface. Therefore, it is necessary to specially design the shape of the focused beam spot so as to avoid uneven surface in the laser irradiated regions because interlaminar insulative value is effected when a stacked core transformer is fabricated from the steel sheets with uneven surfaces. Generally, to make electrical resistivity more reliable, the surface is applied to insulative coating after laser irradiation treatment, but uneven surface may injure resistivity of insulative coating.

The inventors studied the laser irradiating method able to make the laser irradiated surface substantially even and obtain a high interlaminar resistivity. As a result, it has been found that while dependent to a certain extent on the laser average output P and the beam scanning rate V, it is possible to control the interlaminar resistivity by the instantaneous peak power density Ip as determined by the average output P and the irradiated beam cross-sectional area. Here, the Ip is defined by the following equation when the laser average output is P, the rolling direction beam spot diameter is d, and the beam spot diameter perpendicularly to the rolling direction is dc.

$$Ip=P/(d\times dc) \ [kW/mm^2]$$

The resistivity is evaluated by measuring the interlaminar current after coating. FIG. 13 shows the relationship between Ip and the interlaminar current after coating while changing the scan rate V at a constant Ip. A steel sheet with an interlaminar current after coating of 200 mA or less is applicable to a stacked core transformer. From this result, while being affected by the difference of V, if Ip is less than 130 kW/mm$^2$, preferably 100 kW/mm$^2$ or less, more preferably 70 kW/mm$^2$ or less, the interlaminar current is controlled to 200 mA or less. Ip is the factor governing the instantaneous evaporation phenomenon on the surface of steel sheet at the time of laser irradiation, so can be considered the factor governing the surface conditions, in particular the surface roughness. Accordingly, in the method of the present invention, by controlling Ip to 100 kW/mm$^2$ or less, it is possible to produce electrical steel sheet superior in core loss and interlaminar resistivity. For example, at d=0.015 mm and P=150 W, by setting the focused beam spot shape to an ellipse with a dc of preferably 0.127 mm or more, a superior resistivity is obtained.

The laser average output P will be explained. In the present invention as explained above, the range of P/V is defined. Accordingly, if the laser average output P becomes small, the plate width direction beam scan rate V also has to be made proportionally small. However, the method of use of the magnetic domain refinement process of electrical steel sheet according to the present invention, for example as disclosed in Japanese Patent Publication (B) No. 6-19112, is to periodically irradiate a laser beam at a steel sheet divided time-wise. In this case, when the production line speed becomes fast, to maintain the rolling direction irradiation line spacing Pl constant, irradiation period, the scan time to produce required spacing between adjacent scan lines, t (sec) becomes shorter. The range where the scanned beam traverses during the period, Wc, is the product of the scan rate and period t. Accordingly, when the laser average output is small, V is also small and as a result Wc is also small. That is, when the laser average output is small, the width processable by one laser is narrower.

For example, when considering a steel sheet of a width of 1000 mm and a continuous treatment process of a practical product line speed of 30 m/min for example, with a laser with an average output of 10 W or smaller, the width treatable by a single laser would be extremely as narrow as 10 mm and the number of lasers required would exceed 100. Accordingly, the laser output is preferably more than 10 W. Specifically, 20 W, 30 W, 40 W, 50 W, 100 W, 200 W, 300 W, 500 W, 800 W, 1 kW, 2 kW, 3 kW, 5 kW, 10 kW, 20 kW, 50 kW, and other various ones are possible.

INDUSTRIAL APPLICABILITY

The present invention can provide a grain-oriented electrical steel sheet markedly improved core loss by scanning with a small focused laser beam spot.

The invention claimed is:

1. A method of production of a grain-oriented electrical steel sheet superior in magnetic characteristics improving the core loss by forming lined closure domains substantially perpendicular to the rolling direction of the steel sheet and at substantially constant line spacing by scanning continuous wave laser beam, said method of production of grain-oriented electrical sheet characterized in that the laser is of a $TEM_{00}$ mode with an intensity profile of the laser beam in a cross-section perpendicular to the direction of beam propagation having a maximum intensity near the center of the optical axis and in that the focused beam spot diameter in rolling direction d (mm), a linear scan rate V (mm/s) of the laser beam, and an average output P (W) of the laser are in the following ranges:

$$0<d\leq0.2$$

$$0.001\leq P/V\leq0.012.$$

2. A method of production of a grain-oriented electrical steel sheet superior in magnetic characteristics as set forth in claim 1, characterized in that said d, V, and P are in the following ranges:

$$0.010\leq d\leq0.10$$

$$0.001\leq P/V\leq0.008.$$

3. A method of production of a grain-oriented electrical steel sheet superior in magnetic characteristics as set forth in claim 1, characterized in that said d, V, and P are in the following ranges:

$$0.010<d\leq0.060$$

$$0.002\leq P/V\leq0.006.$$

4. A method of production of a grain-oriented electrical steel sheet superior in magnetic characteristics as set forth in claim 1, characterized in that said d, V, and P are in the following ranges:

$$0.010<d<0.040$$

$$0.002\leq P/V\leq0.006.$$

5. A method of production of a grain-oriented electrical steel sheet superior in magnetic characteristics as set forth in claim 1, characterized in that when the focused beam spot diameter in rolling direction is d, the spot diameter in the direction perpendicular to that is dc, and the laser average output is P, the instantaneous peak power density Ip (kW/mm$^2$) is defined as $Ip=P/(d\times dc)$ and the range of Ip is $0<Ip\leq100$ kW/mm$^2$.

6. A method of production of a grain-oriented electrical steel sheet superior in magnetic characteristics as set forth in claim 1, characterized in that said laser is a continuous wave fiber laser with an emission wavelength λ of $1.07\leq\lambda\leq2.10$ µm.

7. A method of production of a grain-oriented electrical steel sheet superior in magnetic characteristics as set forth in claim 6, characterized in that said laser is a continuous wave fiber laser with an average output of 10 W or more.

* * * * *

UNITED STATES PATENT AND TRADEMARK OFFICE
CERTIFICATE OF CORRECTION

| | |
|---|---|
| PATENT NO. | : 7,442,260 B2 |
| APPLICATION NO. | : 10/549723 |
| DATED | : October 28, 2008 |
| INVENTOR(S) | : Tatsuhiko Sakai et al. |

It is certified that error appears in the above-identified patent and that said Letters Patent is hereby corrected as shown below:

On the Title Page, Item 73 should read

-- (73) Assignee: Nippon Steel Corporation, Tokyo (JP) --.

Signed and Sealed this

Twenty-fourth Day of February, 2009

JOHN DOLL
*Acting Director of the United States Patent and Trademark Office*